(12) United States Patent
Aga et al.

(10) Patent No.: US 7,914,715 B2
(45) Date of Patent: Mar. 29, 2011

(54) GRANULATING METHOD, GRANULATED PARTICLE(S) AND GRANULATING DEVICE

(75) Inventors: Koji Aga, Kashiwa (JP); Hiromichi Kobayashi, Kashiwa (JP)

(73) Assignee: Powdertech Co., Ltd., Kashiwa-shi, Chiba (JP)

( * ) Notice: Subject to any disclaimer, the term of this patent is extended or adjusted under 35 U.S.C. 154(b) by 1028 days.

(21) Appl. No.: 11/654,036

(22) Filed: Jan. 17, 2007

(65) Prior Publication Data

US 2007/0180661 A1    Aug. 9, 2007

(30) Foreign Application Priority Data

Jan. 17, 2006    (JP) ................................. 2006-009245

(51) Int. Cl.
*B29B 9/00*    (2006.01)
(52) U.S. Cl. .............................................. 264/9; 264/14
(58) Field of Classification Search .................. None
See application file for complete search history.

(56) References Cited

U.S. PATENT DOCUMENTS

| 4,929,400 | A  | * | 5/1990 | Rembaum et al. | ............... 264/10 |
| 6,780,350 | B1 | * | 8/2004 | Kodas et al. | ...................... 264/9 |
| 6,913,716 | B2 | * | 7/2005 | Lee et al. | ......................... 264/13 |

FOREIGN PATENT DOCUMENTS

JP            2005-137955       *   6/2005

OTHER PUBLICATIONS

Machine translation of JP 2005-137955.*

* cited by examiner

*Primary Examiner* — Mary Lynn F Theisen
(74) *Attorney, Agent, or Firm* — Rothwell, Figg, Ernst & Manbeck, P.C.

(57) ABSTRACT

A granulating method for forming a particle with a continuous ink-jet method using a liquid material, in which the liquid material containing a solid component and a binder component is supplied into one or more ink-jet nozzles of a continuous ink-jet device, a droplet is formed by having the supplied liquid material flow out the ink-jet nozzle, the droplet is carried in to drying means for drying the droplet, and the carried droplet is dried so as to obtain a granulated particle(s), the granulated particle(s) and a granulating device.

11 Claims, 2 Drawing Sheets

GRANULATING METHOD, GRANULATED PARTICLE(S) AND GRANULATING DEVICE

BACKGROUND OF THE INVENTION

1. Field of the Invention

The present invention relates to a granulating method by forming droplets from a liquid material using a continuous ink-jet method and drying the droplets, a granulated particle (s) and a granulating device.

2. Description of the Related Art

As one of granulating methods for producing particles such as powder, granule and so on, is known that a liquid containing a raw material is made into a fine droplet and solidify this droplet by drying or the like. And a technology for producing a high-quality granulated powder has been examined, e.g. a method to form a droplet or to alter the droplet to a particle.

As a granulating method by spray drying, Patent Document 1 (Japanese Patent Laid-Open No. 2001-070779) discloses a technology that a fine particle of a substance to be granulated is carried into a chamber and this particle is accompanied in a dry motion gas flow and given spray of a granulating droplet for granulation. And Patent Document 2 (Japanese Patent Laid-Open No. 2004-082005) discloses a technology that a droplet is generated from a solid-particle dispersed solution continuously flowing through a spray drying chamber using a surface tension and a centrifugal force of a disk atomizer and granulating it by drying.

Also Patent Document 3 (Japanese Patent Laid-Open No. 2004-027313) discloses a technology that in granulating a material powder to be used in a powder metallurgy product, slurry is discharged from a vibrated porous nozzle to discharge the slurry in a divided state and a granulated powder with controlled shape is obtained by quickly drying this divided slurry. And Patent Document 4 (Japanese Patent Laid-Open No. 08-059352) discloses a technology that slurry is dropped on a smooth dropping face having high repellency and its shape is maintained as a droplet in the spherical shape or its deformed shape by surface tension and dried. Moreover, Patent Document 5 (Japanese Patent Laid-Open No. 2005-137955) discloses a technology of producing a particle using an ink-jet method, drying and baking it.

These technologies to produce granulated powder are used in various fields including powder metallurgy products, chemicals, cosmetics, foods and so on. And the particle material which has a required quality, particle diameter, uniformity of particle diameters and the like, are produced depending on the application.

As a quality index of a granulated particle in granulation of a powder material, an average particle diameter and a particle size distribution are used. And it is desired a high-quality granulated particle(s) which has been controlled the average particle diameter and particle size distribution with a high accuracy. If the uniformity of the particle diameter of the granulated powder is low and the particle size distribution is broad, the following problems matter. For example, when processing a material containing a particle using a tank or a hopper, so-called hanging phenomenon or aggregation might occur, and this deteriorates workability. Also, only coarse particle powders which is good liquidity flows into a production line at processing, while granulated powders with a small particle diameter which is poor liquidity remains in a tank or the like, and as a result, the product quality might be uneven. Particularly, in a ferrite, dielectric material, battery material or the like which needs baking or sintering after filling a die, the process accompanied by volume change a filling amount is fluctuated by a material powders with unevenness quality. It causes distortion, a crack, a hole and unevenness characteristic values or the like in a product after baking or sintering. And the above related arts of Patent Documents 1 to 5 have the following problems.

When a granular material is produced by the granulating method of Patent Document 1, since the droplet is generated only by surface tension of a continuously flowing granulating liquid, there is a tendency that the particle size distribution broader. Also, since the particle diameter is controlled by the nozzle diameter and a supply amount of the granulating liquid, particle-diameter control is possible but the particle size distribution might become different depending on the condition. And the broader particle size distribution of actual products against a desired particle size distribution is a problem. Moreover, the granulated powder might be withdrawn into a bag filter or the like, which is a problem in yield.

With Patent Document 2, since the continuously flowing solid-particle dispersed solution is made into droplets using surface tension and a centrifugal force of the disk, the particle size distribution becomes broader. And since the particle size distribution is controlled by a rotation speed of the disk and a supply amount of slurry, the control is difficult and combined with broader particle size distribution, it constitutes a problem in yield. Also, since granulated materials with a relatively small particle diameter are withdrawn into a bag filter and the like at drying, the yield is further lowered.

With the granulating method and the granulating device of Patent Document 3, since the diameter of the porous nozzle is not necessarily uniform, the particle size diameter easily becomes broader. Moreover, since droplets are generated by vibrating the porous nozzle to divide the slurry, even if the nozzle diameter is uniform, the holes are closely adjoined to each other and moreover, the droplets are generated substantially at the same timing. Thus, droplets coming from the porous nozzle adhere to each other and generation of deformed particles or the like can not be avoided, which causes a problem in the yield of single dispersed particles. Also, in order to dry the droplets ejected from the porous nozzle instantaneously, a discharge port of the porous nozzle should be located adjacent to a mechanism for drying the droplets. Therefore, the discharge port of the porous nozzle is exposed in a dry state, and especially when it is exposed in a high-temperature dry state, the porous nozzle part can be deteriorated. Moreover, since the porous nozzle itself is constructed to be vibrated so as to generate droplets, there is a possibility of physical and dynamic deterioration such as damage or abrasion of the porous nozzle due to vibration in use, and the deterioration of the porous nozzle during the use is a problem.

With Patent Document 4, since particles are obtained by having generated droplets rolling on a heating surface for drying, deformation of the granulated particles is a problem. The dropping surface used in the granulating method has a possibility that water repellency of the heating surface is lowered and stable spherical particles can not be obtained. Moreover, when a large quantity of particles are to be granulated, there is a possibility that a heat amount of the heated dropping surface does not satisfy a heat amount required for granulation, which is a problem in mass production.

In Patent Document 5, emulsion is used as ink, and a piezo method, a thermal ink-jet method, a bubble-jet (registered trademark) method or the like is used as an ink-jet method. Since the thermal ink-jet method and the bubble-jet (registered trademark) method have the emulsion injected with energy of air bubbles at evaporation of a liquid by heating, a high-temperature heat is applied to the emulsion (ink) and that affects composition of a liquid material and restricts types of granulated particles which can be produced. Also, the surface temperature of a heater used for heating to a temperature to generate air bubbles becomes high, a load is given to a heater, ink, an ink head and the like, and deterioration of those parts in use is a problem. On the other hand, with the piezo method, since the emulsion is discharged by deformation of a piezo element to which a voltage is applied and new emulsion is supplied to the nozzle part, if the viscosity of the emulsion is high, a pressure required for supply of ink becomes high, while if a drive frequency of the piezo element is lowered in response to that, a production drops and desired droplet formation becomes difficult, which is a problem in yield. Also, in a piezo-type ink-jet device, the liquid material is collected in an ink reservoir in an ink-jet nozzle once without fail, it is going to be more likely that a solid component settles and clogs the nozzle according to the composition of the liquid material, if the flow of the liquid material stops even for a short time. That is, there is a problem that many restrictions on the state, contained components, viscosity and the like of the liquid material, to be a material narrow the range of the composition and particle diameter available for granulation.

SUMMARY OF THE INVENTION

The present invention has an object to provide a granulating method, a granulated particle(s) and a granulating device which can form a discretional particle size distribution, support a wide variety of particle diameters, select a wide range of composition in a liquid material and improve productivity.

Then, after intensive research, the inventors employed the following means in order to solve the above problems.

The granulating method according to the present invention is a method for forming a particle from a liquid material by using a continuous ink-jet method, in which the liquid material containing a solid component and a binder component is supplied into one or more of the continuous ink-jet nozzle, a droplet is formed by ejecting the supplied liquid material from the ink-jet nozzle, the droplet is carried into drying means for drying the droplet, and drying the carried droplet in order to obtain a granulated particle(s).

The granulated particle(s) here means a powder, a particle and the like or their mixture such as inorganic substances metal, metal oxides, metal hydroxides, metal carbonates, carbon black, silicon dioxide, e.g. and organic substances such as edible powder, resin and the like. And it is not only a single substance, but also it in a state where a several kind of granulated particle(s) with different components are mixed. The solid component means a component remaining as a solid even in the state where the granulated particle(s) is formed. Moreover, the binder components can be used polyvinyl alcohol (PVA), starch, agar, various resins and so on.

The continuous ink-jet method is an ejection method that the flow of an ink or the like which is converted a small droplet after ejected from the nozzle and is used in a printer or the like, for example. In general, the continuous ink-jet method uses a nozzle which is equipped with a piezo element to inject a liquid such as ink, and the state of the liquid such as ink flow out from the nozzle is controlled by applying a voltage of a constant frequency to the piezo element. That is, the piezo element with superimposed voltage applies fluctuating pressure corresponding to a predetermined frequency on the liquid such as ink continuously flowing out of the ink-jet nozzle when it passes through the nozzle. By this fluctuating pressure, the liquid such as ink immediately after eject from the nozzle is not separated to a droplet although the liquid flow is affected by a pressure difference, and the liquid flow at the position with a predetermined distance from the nozzle is changed the shape to the droplet of a desired size. In the present invention, the droplet forming method of the above described continuous ink-jet method is applied to the production of granulated particle(s) from the liquid material. That is, it is only necessary that a droplet of a desired size is formed from a liquid material flow which is after injected from the nozzle and this droplet is carried into drying means.

In the granulating method according to the present invention, it is preferable that controlling a condition of the liquid flow from the ink-jet nozzle in order to keep a desired droplet diameter while monitoring the formed droplet.

Also, in the granulating method according to the present invention, when the above two or more ink-jet nozzles are used, it is preferable to set an average diameter of droplet formed from each of the ink-jet nozzles.

Moreover, in the granulating method according to the present invention, when the above two or more ink-jet nozzles are used, it is preferable to form the droplet so as to change the component of the droplet formed from each ink-jet nozzles.

And in the granulating method according to the present invention, it is preferable that the solid component of the liquid material contains one or more of those selected from the inorganic or organic substances. For example, the liquid material is slurry, suspension, water solution, emulsion or the like.

In the granulating method according to the present invention, it is preferable that the liquid material is used after removing coarse particles by a filter of 500 mesh or more.

Also, in the granulating method according to the present invention, it is preferable that the liquid material is used with the viscosity of 500 mPa·s or less. The viscosity is measured under a condition of 62.5 rpm using a rotating viscometer. Since the reliability is not enough for the viscosity at a detection limit value or less for the liquid material, the lower limit is not specified but at least 500 mPa·s is specified to be set as an upper limit.

Also, in the granulating method according to the present invention, it is preferable to add a thickening agent to the liquid material.

Moreover, in the granulating method according to the present invention, it is preferable that the diameter of the ink-jet nozzle is selectively-used in a range of 20 μm to 120 μm according to the particle diameter of a granulated particle (s).

Also, in the granulating method according to the present invention, eject of the liquid material from the ink-jet nozzle is carried out such that the liquid material is continuously supplied into the ink-jet nozzle at a constant speed and ejected at a constant speed by a supply liquid material pressure, and applying the fluctuation pressure to a liquid material flow passing through the ink-jet nozzle is preferable.

And in the granulating method according to the present invention, it is preferable that using the piezo element and an applying pressure to the liquid material flow is made fluctuate based on controlling an applied voltage to the piezo element.

And a granulated particle(s) of the present invention, it is preferable that is produced by any of the above granulating methods and its average particle diameter is a range of 5 μm to 500 μm. The average particle diameter here is obtained by measuring Feret diameter of the photographed granulated particle(s) by a scanning electronic microscope (SEM) and calculating a number average particle diameter of the particles from the measurement result.

Also, a granulating device according to the present invention which is characterized in the granulating device for carrying out any of the above granulating methods, and in the granulating device, a liquid reserving part, a eject part, a drying part and a collecting part are consecutively installed, in which the liquid material reserved in the liquid reserving part is continuously supplied to one or more ink-jet nozzles provided at the eject part, the liquid material in the ink-jet nozzle is ejected from the ink-jet nozzle by a continuous ink-jet system provided at the eject part and formed into a droplet, the formed droplet is carried into the drying part, the carried droplet is dried in the drying part, and the granulated particle(s) is collected at the collecting part.

And in the granulating device of the present invention, it is preferable that the diameter of the ink-jet nozzle is selectively-used in a range of 20 µm to 120 µm according to the particle diameter of a particle(s) to be granulated.

Also, in the granulating device of the present invention, it is preferable that the eject condition of the liquid material is controlled by the continuous ink-jet system so that an average particle diameter of a granulated particle(s) to be produced has a desired average particle diameter between 5 µm to 500 µm.

Moreover, in the granulating device of the present invention, it is preferable that measuring means for measuring the droplet diameter of the formed droplet is provided and control means for operating the controls of the eject condition of the liquid material so as to have a predetermined droplet diameter according to the measurement result by this measuring means.

And in the granulating device of the present invention, it is preferable that when two or more ink-jet nozzles are used, the continuous ink-jet system controls the eject state of the liquid material according to the shape and/or components of a droplet to be formed for each ink-jet nozzle.

Moreover, in the granulating device of the present invention, it is preferable that the liquid reserving part is provided with an agitating system for agitating the liquid material so as to maintain a mixed state so that a state where a solid component contained in the liquid material is uniformly dispersed is maintained by this agitating system. Here, the liquid material in the mixed state is a state where components of the liquid material are mixed with each other with uniformity due to settlement or the like.

Granulating method: The granulating method according to the present invention is a method for forming particles with a continuous ink-jet method from a liquid material, in which a liquid material containing a solid component and a binder component are supplied into one or more ink-jet nozzles of a continuous ink-jet device and the supplied liquid material is ejected from the ink-jet nozzle to form a droplet. Thus, by using the continuous ink-jet method, the size of the formed droplets can be made uniform at a desired one with accuracy, and the droplet diameter can be made uniform before drying. And since the droplet is carried into the drying means for drying the droplets and the carried droplets are dried so as to obtain a granulated particle(s), it can be produced the granulated particle(s) with sharp particle size distribution. Therefore, the granulated particle(s) produced by the granulating method according to the present invention have the desired average particle diameter and the desired particle size distribution, which is effective for maintaining product quality, and can also eliminate processes such as classification in a post-process, which is effective in production cost.

Moreover, in the piezo-type ink-jet device, for example, since the liquid material (ink or the like) is reserved in the ink reservoir in the ink-jet nozzle once without fail, there is a higher possibility that the solid component settles and plugs the nozzle if the flow of the liquid material is stopped even for a short time depending on the components of the liquid material, but with the continuous ink-jet method, the liquid material to which a pressure is applied in the fluctuated state is made to flow out continuously and the droplets are formed after through out from the nozzle. Therefore, there are fewer restrictions on the relation between the liquid material and the eject from the nozzle as compared with the other ink-jet methods, and a range of selection for the nozzle diameter, the solid component in the liquid material, viscosity and the like can be taken wider and a many variety of types of granulated particle(s) can be produced. Also, by using the continuous ink-jet method, since timing for forming the droplet from the liquid material can be controlled, eject can be made at the timing such that the formed droplets are not adhere to each other, and it can be restricted occurrence of granulated particle(s) out of specification. Therefore, it can be produced the granulated particle(s) with a high yield, and it is not needed a process such as classification to make the particle diameter of the granulated particle(s) uniform, to improved the production efficiency, and it can be granulated economically. Also, as mentioned above, the granulated particle(s) with a uniform particle diameter can be obtained by forming and granulating the droplets by ink-jet, and moreover, it can be made the particle diameter of the granulated particle(s) with a higher accuracy by controlling the eject condition of the liquid material so that a desired droplet diameter can be formed while monitoring the droplet diameter of the formed droplet.

Granulated particle(s): Since the granulated particle(s) according to the present invention is made by using the above granulating method and its average particle diameter is 5 µm to 500 µm, the granulated particle(s) produced from the liquid material containing a solid component and a binder component supports a variety of particle diameters and is made with a sharp particle size distribution. Particularly, it can be obtained a granulated particle(s) with a sharp particle size distribution even with a small particle diameter.

Moreover, to control the eject function for each ink-jet nozzle according to the shape and/or components of the droplet to be formed, it made a granulated particle(s) corresponding to a discretional particle size distribution or a granulated particle(s) made of a mixture can be produced.

Granulating device: The granulating device according to the present invention is a granulating device for carrying out the above granulating method, and it is consecutively installed a liquid reserving part, a eject part, a drying part and a collecting part. And the liquid material reserved in the liquid reserving part is continuously supplied to one or more ink-jet nozzles provided at the eject part, the liquid material into the ink-jet nozzle is ejected from the ink-jet nozzle by a continuous ink-jet system provided at the eject part so as to form a droplet, the formed droplet is carried into the drying part. And the carried droplet is dried in the drying part to form a granulated particle(s), and the granulated particle(s) is collected in the collecting part. Thus, the size of the droplet can be uniformed with accuracy before drying, and a granulated particle(s) with a sharp particle size distribution can be produced easily. Also, since the particle diameter of the granulated particle(s) can be controlled by controlling the diameter of a droplet formed from each ink-jet nozzle, its yield becomes high and moreover, since there is no need to perform a process for making the particle diameter of the granulated particle(s) uniform such as classification, economical granulation can be realized with good production efficiency. Also, even if classification is to be carried out, since there is little occurrence of sub-standard products, it can be restricted a discard amount and care for economy and environment.

By providing the measuring means for measuring the droplet diameter of the formed droplet and by controlling the eject condition of the liquid material so that a predetermined droplet diameter is obtained according to the measurement result of this measuring means, the granulated particle(s) can be made with a desired particle diameter with higher accuracy.

Moreover, when two or more ink-jet nozzles are used, by controlling the eject function for each ink-jet nozzle according to a discretional shape and/or components of the droplet, the granulated particle(s) with a desired blending quantity can be produced all at once even if the particle diameter and/or components are different. As the result, it can be produced the granulated particle(s) according to a desired particle size distribution easily and efficiently without classification according to the particle size distribution to be produced or blending of powders with different particle diameters. Also, the granulated particle(s) with a desired blending ratio or particle size distribution can be made all at once because a discretional particle diameter and particle size distribution can be realized. For example, in the case of requiring a high filling rate powder which is different particle diameters are blended being filled the small particles between the large particles is preferable, and it is desired appropriate particle size distribution even though the particle size distribution is not sharp. Therefore, it can be granulated set in advance and produced all at once, for example, a granulated particle(s) with normal particle size distribution, or the particle size distribution with more than one peaks of different particle diameters. So, it is unnecessary to blend a different type of powder after granulation when producing such a powder.

DETAILED DESCRIPTION OF THE PREFERRED EMBODIMENTS

The best mode for carrying out a granulating method, a granulated particle(s) and a granulating device according to the present invention will be described below.
[Granulating Method]
The granulating method according to the present invention is a method for forming a particle by a continuous ink-jet method and comprises the following processes:
Process 1: A liquid material containing a solid component and a binder component is supplied into one or more ink-jet nozzles of a continuous ink-jet device, and the supplied liquid material is ejected from the ink-jet nozzle so as to form a droplet.
Process 2: The droplet is carried to drying means for drying droplets.
Process 3: The carried droplet is dried for granulation.
Process 4: The produced granulated particle(s) is collected.
Each process will be described below.
Process 1: In the Process 1, a liquid material containing a solid component and a binder component is supplied into one or more ink-jet nozzles of a continuous ink-jet device, and the supplied liquid material is ejected from the ink-jet nozzle so as to form a droplet.
The liquid material contains the solid component and the binder component, and this solid component contains one or more components selected from inorganic or organic substances. The inorganic substances include, for example, metal, metal oxides, metal hydroxides, metal carbonates, carbon black, silicon dioxide and the like. The organic substances include edible powder, resin and the like. Also, the binder components include polyvinyl alcohol (PVA), starch, agar, various resins and the like. The state of the liquid material can be slurry, suspension, water solution, emulsion in which a hydrophobic substance such as a resin is dispersed in water and the like, for example.

By using the liquid material after removing coarse particles by a filter with over 500 mesh, the liquid material from which the coarse particles have been removed is supplied to the ink-jet nozzle, and plugging of the ink-jet nozzle by the coarse particle diameter can be prevented. Here, the filter with below 500 mesh can not remove coarse particles with the size to easily plug the ink-jet nozzle. More preferably, the coarse particles are removed by using a filter of over 600 mesh beforehand.

And it is preferable that the viscosity of the liquid material is 500 mPa·s or less. If the viscosity of the liquid material exceeds 500 mPa·s, it is too high for the liquid material to be ejected from the ink-jet nozzle. And a diameter of the ink-jet nozzle and a pressure to be applied to the liquid material are controlled according to the viscosity of the liquid material. The liquid material is supplied into the ink-jet nozzle with the mixed state.

And it is preferable to use the liquid material which is added a thickening agent. By adding a thickening agent to the liquid material under 500 mPa·s in the viscosity prevented the solid component sedimentation, as the result the dispersion become stable in the liquid material. Particularly, it is necessary to use a small nozzle or to use the liquid material with small amount of the solid component when granulating a small particle(s). In this case, the viscosity of the liquid material is tend to lower, so preparing suitable viscosity by a thickening agent, and then, the dispersion become more stable. And in the case of using small amount of the solid component, a thickening agent can makes a solid component disperse more stably; it is preferable in the point to produce a granulating particle(s) with good quality in the liquid material. Moreover, in the case of containing a higher specific gravity in the liquid material, a thickening agent can makes a solid component disperse stably. It can be used polymer of acrylic acid, starch, xanthan gum, polyethylene glycol distearate, or the like as a thickening agent.

The continuous ink-jet device is provided with a piezo element (piezoelectric element) as means for controlling the condition of the liquid material flow out the ink-jet nozzle. The piezo element changes its stretch according to the voltage applied to the piezo element. This nature of the piezo element use for controlling a drive frequency of the piezo element by applying a voltage with a predetermined frequency to the piezo element, it makes the pressure to the liquid material flow which is streaming the ink-jet nozzle is changed according to the stretch change. Therefore, the liquid material is through out of the ink-jet nozzle as a droplet in the separatable state with a constant interval even though not being separated. After that, a droplet is formed by separating from the liquid material flow.

That is, the liquid material continuously supplied into the ink-jet nozzle at a constant speed is continuously ejected at a constant speed by the supplied liquid material pressure. And by applying the fluctuation pressure to the liquid material flow passing through the ink-jet nozzle before eject, the droplet is formed by separation from this liquid material flow after through out from the nozzle, and as a result, a droplet with a predetermined size is formed at a predetermined speed.

With the above continuous ink-jet method, by controlling the intensity of pressure to the liquid material through out the ink-jet nozzle can be separated the liquid material as a droplet at a desired timing. Therefore, by controlling the diameter of the ink-jet nozzle and the voltage to be applied to the piezo element and its frequency according to this nozzle diameter, the liquid material can be flowed out so that it will be separated into a droplet with a desired size and then droplets with a uniform droplet diameter can be formed.

The size of the droplet formed is controlled by the viscosity of the liquid material and the drive frequency of the piezo element. Moreover, the upper-limit drive frequency of the piezo element is calculated based on the nozzle diameter and the injection speed of the ink-jet nozzle, and a range of about 5 KHz to 720 KHz is possible, which can increase the droplet forming amount per unit time. In the case of the continuous ink-jet method, there is little restriction on the diameter of the ink-jet nozzle as compared with the piezo method forming the droplet at the discharge step, and a wide range of nozzle diameters can be used. Also, since the liquid material does not remain but distribute from the liquid reserving part to the nozzle, the solid component contained in the liquid material hardly plugs the nozzle and the range of selection of the composition in the liquid material can be made wider.

The diameter of the ink-jet nozzle is set in a range of 20 μm to 120 μm according to the particle diameter of a granular particle(s) to be granulated. If the diameter of the ink-jet nozzle is below 20 μm, it is so small for the liquid material containing a solid component to be ejected hardly and not practically suitable. On the other hand, if the diameter of the ink-jet nozzle is more than 120 μm, an amount of flow is too much and as a result, the droplet becomes so large that hardly drying with maintaining the preferable shape in the next drying means and difficult to granulate.

The speed of the liquid material flow from the ink-jet nozzle is controlled according to the liquid material in order to obtain a predetermined speed. That is, by controlling the diameter of the ink-jet nozzle, the viscosity of the liquid material and the supply speed of the liquid material to be supplied into the ink-jet nozzle, the liquid material are controlled to be flowed at a constant speed.

By controlling the condition of the liquid material flow while monitoring the formed droplet so that a desired droplet diameter is formed, high-quality granulated particle(s) with a uniform particle diameter can be produced with high accuracy. That is, there can be slight change in the particle diameter of the granulated particle(s) due to slight change in the nature of the solid amount in the liquid material, viscosity and the like, even if the continuous ink-jet method is used. It is effective to optimize the forming condition of a droplet while monitoring the formed droplet diameter in order to respond to this change and to maintain the droplet diameter constant with higher accuracy. Also, a change in the droplet accompanying nonconformity or the like during production can be discovered at an early stage, and production loss can be minimized. A method for monitoring can be arrangement of a CCD camera and the like at a eject port side of the ink-jet nozzle, for example.

Though a capacity of forming the particle per ink-jet nozzle is small, when two or more ink-jet nozzles are used for the above granulating method, productivity can be improved even with a method using an ink-jet nozzle. When a droplet is formed by using two or more ink-jet nozzles, by forming a monodisperse particle with more than one of ink-jet nozzles, not only that production can be increased but also the particle diameter of the granulated particle(s) can be uniformed, and yield of the granulated particle(s) with a uniform quality can be improved.

The condition of flow can be also controlled for each ink-jet nozzle to form a different droplet for each ink-jet nozzle according to the component and/or shape of the droplet which is formed after ejected from each ink-jet nozzle. In this case, by controlling the condition of flow by changing the factor of droplet formation in each ink-jet nozzle such as nozzle diameter, a voltage applied to the piezo element, a drive frequency of the piezo element and the like, a granulated particle(s) with a discretional particle size distribution can be produced efficiently. Therefore, the granulated particle(s) forming a discretional particle size distribution or a mixture can be produced all at once, and a process to blend granulating powders with different components and/or shape can be omitted.

Process 2: The droplet is carried into the drying means for drying the droplet. Since the eject direction of the droplet formed after ejected from the ink-jet nozzle is stable, the droplet can be accurately carried into the drying means from the ink-jet nozzle.

Process 3: Granulation is realized by drying the carried droplets. That is, the drying means is to dry the droplets to the extent that they can be altered into a granulated particle(s), and air-flow generating means or the like may be provided for agitating the atmosphere in a container such as a drying chamber. The droplets carried into this drying means are dried by the air-flow, dry gas, temperature and the like and changed to granulated particle(s).

Process 4: The granulated particle(s) granulated in the process 3 are collected in a collecting part. The granulated particle(s) collected using a cyclone classifier is stored in a container.

[Granulated Particle(s)]

The granulated particle(s) according to the present invention is granulated using the above granulating method. By using the above granulating method and controlling the driving mechanism of the ink-jet nozzle according to the factor of the granulated particle(s) to be produced such as the particle diameter, particle size distribution and the like, droplets with a uniform discretional size are formed and then, dried for granulation. Thus granulated particle(s) have a sharp particle size distribution irrespective of the particle diameter. And the granulated particle(s) with a discretional size with the average particle size between 5 μm and 500 μm are produced by adjusting the characteristics such as the solid amount, viscosity, particle diameter and the like of the liquid material and the ink-jet nozzle diameter and by controlling the voltage applied to the piezo element and the drive frequency of the piezo element. That is, since there are many factors controlling the droplets to be formed, the granulated particle(s) with a wide variety of particle diameters can be produced while maintaining a sharp particle size distribution. And particularly, a favorable particle size distribution can be realized in production of the granulated particle(s) with a fine average particle diameter. The average particle diameter of the granulated particle (s) to be a high-quality granulated particle(s) with restricted variation in particle diameter is more preferably controlled to have a desired average particle diameter from 15 μm to 500 μm and further preferably from 20 μm to 400 μm.

[Granulating Device]

In the granulating device according to the present invention, a liquid reserving part, a eject part, a drying part and a collecting part are consecutively installed.

The liquid reserving part reserves the liquid material for delivering a prepared liquid material to the eject part and piped so that the liquid material is transported from this liquid reserving part to the eject part, which will be described later. The liquid reserving part is provided with a container which can reserve a liquid material and is capable of sealing and an agitating system. And it is preferable for maintaining a mixed state by agitating the liquid material so that the state where the solid component contained in the liquid material is dispersed and mixed in the liquid material is maintained by this agitating device. By this, settlement of the solid component contained in the liquid material is prevented, and droplets without variation in components can be formed smoothly. Plugging of the ink-jet nozzle with the liquid material with many solid components can be also prevented.

The liquid material stored in the liquid reserving part preferably has coarse particles removed by a filter of 500 mesh or more in advance. Then, the liquid material having the coarse particles removed by a filter in advance may be supplied to the liquid reserving part, but the above filter may be provided at an input port of the liquid reserving part for the liquid material.

By constructing so that the liquid reserving part connected so that the liquid material can be supplied to the ink-jet nozzle is pressurized and is automatically supplied into the ink-jet nozzle according to a decrease amount of the liquid material flowed from the ink-jet nozzle, the supply speed of the liquid material into the ink-jet nozzle is synchronized with the eject speed of the liquid material flow, and liquid material injecting means such as a pump is not needed any more.

When two or more ink-jet nozzles are provided and to be produced a mixture particle(s) with difference components, it can be provide more than one liquid reserving parts and the liquid reserving parts may be consecutively installed in correspondence with each ink-jet nozzle.

The eject part is provided with an ink-jet device. The eject device is provided with one or more ink-jet nozzles, a piezo element (piezoelectric element) as a system for controlling the eject state of the liquid material from the ink-jet nozzle, and an ink-jet nozzle driving device for applying a voltage to the piezo element. And the ink-jet nozzle is consecutively provided so that the liquid material can be supplied from the liquid reserving part. The diameter of this ink-jet nozzle in a range of 20 μm to 120 μm is selected and used according to the particle diameter or particle size distribution of the particle(s) to be granulated. And the eject state of the liquid material is controlled by the continuous ink-jet system so that the average particle diameter of the granulated particle(s) to be produced has a desired average particle diameter between 5 μm to 500 μm. That is, when a voltage of a predetermined frequency is applied to this piezo element by controlling the ink-jet nozzle driving device, the stretch of the piezo element is changed in correspondence with the drive frequency and a pressure to the liquid material supplied into the ink-jet nozzle is changed. By this, the liquid material is flowed from the ink-jet nozzle without separation even in the state where the liquid material is easily separated as droplets with a constant interval.

Since the piezo element can not withstand a high-temperature heat when a device for cooling the element itself is not provided, the eject part is arranged outside the drying part. But if the drying part employs drying at a temperature which the piezo element can withstand such as room-temperature drying or if the piezo element provided with the cooling device is arranged at the eject part, the eject part may be arranged inside the drying part. However, since the ink-jet nozzle can easily determine the eject direction, even if the eject part is arranged outside the drying part, by arranging the eject part and the drying part in the positional relation so that the droplet formed after being flowed from the ink-jet nozzle advances toward an opening provided at the drying part, which will be described later, the droplet can be accurately carried toward the opening from the ink-jet nozzle.

When it is so constructed that a deflection voltage is applied to the droplets so that the droplets separated from the liquid material and formed after being flowed from the ink-jet nozzle are directed toward a predetermined advance direction, the advance direction of the droplets can be easily adjusted and the droplets can be carried into the drying part more accurately. Therefore, the installation position of the drying part is not limited to immediately under the eject part but even when the drying part is arranged at a lower part, fine adjustment of the nozzle and the drying part can be made by the deflection voltage. Also, if the droplets are not carried into the drying part, by applying the deflection voltage to the droplets so that they enter a container for recovering the droplets, the liquid material collected in the recovery container can be reused and it is not wasted.

In the conventional granulating method such as a disk atomizer method, the mechanism for forming the droplets is under heat inside the drying mechanism and a eject port is provided under a dry environment, but with the granulating method according to the present invention, there is no need to arrange the ink-jet nozzle for forming the droplets inside the drying part, and the ink-jet device is hardly affected by heat or dry and can be a device which is difficult to deteriorate over time during use. Also, since the ink-jet device can be installed outside the drying device, only operation of the ink-jet nozzle part can be stopped for work at inspection or repair of the ink-jet device, and a droplet drying process does not have to be stopped at the drying part, and lowering of productivity can be minimized as much as possible.

Moreover, by providing measuring means for measuring a droplet diameter of a formed droplet and by providing means for controlling the condition of the liquid material flow so as to have a predetermined droplet diameter according to the measurement result by this measuring means, the droplet diameter can be controlled with higher accuracy. As the measuring means, a CCD camera and the like can be used, for example. By arranging a CCD camera on the side part of the discharge port of the ink-jet nozzle and by using a flash light synchronized with the drive frequency of the piezo element of the ink-jet nozzle, an image is taken by the CCD camera for measurement. If the measurement result is deviated from the desired droplet diameter, the ink-jet nozzle driving device is controlled so as to obtain the desired droplet diameter. In this way, by controlling the flow condition from the ink-jet nozzle while measuring and monitoring the formed droplet diameter so as to obtain the desired droplet diameter, the droplet diameters can be uniformed with higher accuracy, and as a result, the particle diameters of the granulated particle(s) can be uniformed with higher accuracy.

The drying part can be provided with means for maintaining a container body for storing the droplets in a dry state to the extent that the droplet can be changed to a granulated particle(s) and air-flow generating means or the like for agitating the atmosphere in the container. As a result, it is only necessary that a mechanism for changing the carried droplets to granulated particle(s) while maintaining the shape in the drying part is provided.

The collecting part is a device for collecting the granulated particle(s) dried in the drying part and is provided with collecting means such as a cyclone classifier and a collecting container for storing the granulated particle(s) collected by this collecting means, for example. And by a method for sucking the granulated particle(s) in the drying part, for example, the granulated particle(s) are collected. At this time, by appropriately setting an air pressure difference between in and outside the collecting part, drop of yield can be prevented.

The present invention will be specifically described below referring to Examples and Comparative Examples. The present invention is not limited to the following examples.

EXAMPLE 1

Figure 1:
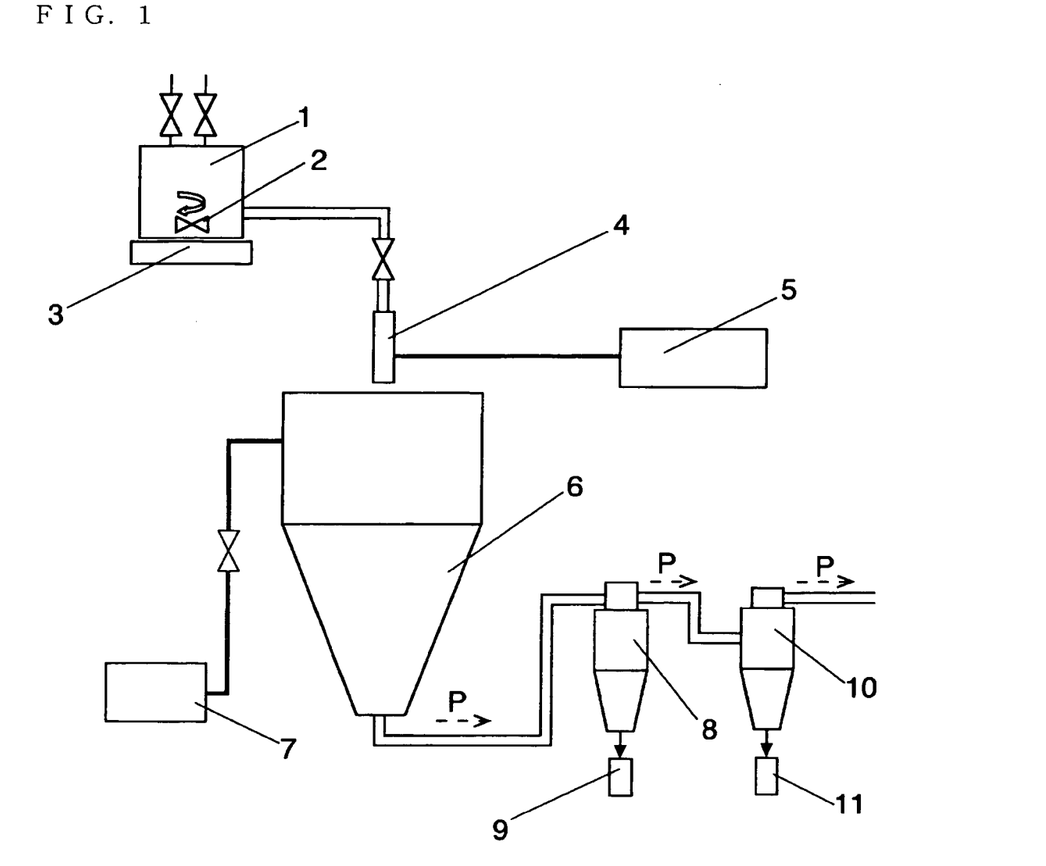
FIG. 1 is a schematic view of a granulating device of Example 1.

Granulating device: FIG. 1 is a schematic view of a granulating device in Example according to the present invention. As shown in FIG. 1, the granulating device in Example 1 comprises a liquid reserving part (a pressure vessel 1, a stirring bar 2, a magnetic stirrer 3), a eject part (an ink-jet nozzle part 4, an alternating current generating device 5 for driving ink-jet nozzle), a drying part (a drying chamber 6, a drying mechanism 7), a collecting part for collecting the granulated particle(s) (a cyclone 8, a granulated particle(s) collecting container 9), a bag filter 10 for collecting fine powders in the granulated particle(s), and a micro powder collecting container 11.

The liquid reserving part is provided with a container which can reserve a liquid material and is capable of sealing (pressure vessel 1) and the magnetic stirrer 3 as an agitating system, and the container is arranged on the magnetic stirrer 3. And inside the container, the stirring bar 2 is stored together with the liquid material. In this Example, a single liquid reserving part is provided, but if two or more ink-jet nozzles are provided and a mixture made of particle(s) with difference components is to be produced, more than one liquid reserving part may be provided and the liquid reserving parts may be consecutively installed in correspondence with each ink-jet nozzle.

The eject part comprised the ink-jet nozzle part 4 made of a plurality of ink-jet nozzles (not shown) and the alternating current generating device 5 for driving ink-jet nozzle for controlling the driving condition of the ink-jet nozzle. Each ink-jet nozzle part 4 is provided with a piezo element (not shown), respectively, and by applying a voltage of a constant frequency to the piezo element from the alternating current generating device 5 for driving ink-jet nozzle, the stretch state of the piezo element is changed. The liquid material supplied from the liquid reserving part is continuously distributed through the ink-jet nozzle and when this liquid material flow passes through the nozzle, a pressure of a predetermined cycle is applied to the liquid material flow by change of the stretch state of the piezo element, by which a pressure fluctuation is added to the liquid material flow. Thus, the liquid material is flowed out in the state separated into droplets with a set size while advancing to the discharge direction constantly.

As measuring means for measuring the diameter of the formed droplet, a CCD camera is arranged on the side of the eject port of the ink-jet nozzle, and an image is taken by the CCD camera for measurement using a flash light synchronized with the drive frequency of the piezo element of the ink-jet nozzle. By providing means for controlling the eject state of the liquid material so as to obtain the predetermined droplet diameter according to the measurement result of this measuring means, the droplet diameter can be controlled with higher accuracy. If the measurement result is deviated from the desired droplet diameter, conditions such as the speed of the liquid material flow, the voltage applied to the liquid material, the drive frequency of the piezo element and the like are controlled to have the desired droplet diameter.

The drying part is an air-flow drying device with the height of 2 meter, and this air-flow drying device has an opening (not shown) opened in the advance direction of the liquid material discharged from the ink-jet nozzle, and the droplets carried from this opening is dried under the environment with the drying temperature and air volume controlled so as to form granulated particle(s).

The collecting part is provided with the cyclone 8 and the granulated particle(s) collecting container 9 for storing the granulated particle(s) taken out by this cyclone 8, and the granulated particle(s) is conveyed by an air flow flowing in a direction shown by an arrow P. Small granulated particle(s) which could not be collected by the cyclone 8 are further collected by the consecutively connected micro powder collecting device (bag filter 10) and collected in the micro powder collecting container 11 so that stricter quality control is realized and industrial safety can be maintained.

Granulating method using the granulating device: Next, the granulating method will be described using the above granulating device in order to produce a Mn—Mg—Sr ferrite precursor as a granulated particle(s) with the average particle diameter of 10 μm. First, a liquid material is prepared. 25 liters of water is poured in a beads mill with the capacity of 40 liters and then, 15.53 kg of ferric oxide ($Fe_2O_3$), 8.90 kg of trimanganese tetroxide ($Mn_3O_4$), 0.57 kg of magnesium hydroxide ($Mg(OH)_2$), and 0.72 kg of strontium carbonate ($SrCO_3$) are inputted. As a binder component, 250 g of 10 wt % polyvinyl alcohol (PVA) solution is added. Moreover, 275 g of 60 wt % of polycarboxylate polymer type surfactantsa solution as a dispersing agent, and 125 g of xanthan gum powder as a thickening agent are added. And then, crushing mixing is performed for 2 hours, and the prepared slurry is filtered by a mesh net made of stainless with 635 mesh to remove coarse particles and to prepare the liquid material. The solid amount of the liquid material is 50 wt %. And the viscosity of this liquid material is 100 mPa·s.

Then, a pressure vessel 1 is sealed after the liquid material and the stirring bar 2 for the magnetic stirrer 3 are put in. After that, to apply pressure to a pressure vessel 1 by sending compressed air into it. The liquid material with the stirring bar 2 enclosed is agitated by the stirring bar 2 rotated by the magnetic stirrer 3, and the mixed state where the solid component contained in the liquid material is dispersed in the liquid material is maintained.

The diameter of the ink-jet nozzle is set at 60 μm according to the conditions of the viscosity of the liquid material and the like so that the average particle diameter of a granulated particle(s) to be produced at 100 μm. Also, an alternating voltage with a sinusoidal wave of the frequency of 70 KHz and amplitude of 5V is set to be applied to the piezo element from the alternating current generating device for driving ink-jet nozzle.

The liquid material in the mixed state is supplied to the ink-jet nozzle of the eject part connected to the liquid reserving part. By applying an alternating voltage with a sinusoidal wave of the frequency of 70 KHz and amplitude of 5V to the piezo element so as to increase and decrease the pressure applied to the liquid material in the ink-jet nozzle from the piezo element, the liquid material supplied into the ink-jet nozzle of the eject part is ejected in the state of a droplet separated from the liquid material with a constant interval even though they are continued when the liquid material is discharged from the eject part of the ink-jet nozzle.

At this time, the pressure to the liquid material to be supplied is controlled at the liquid reserving part so that the liquid material is flowed at a constant speed of 10 m/s. The injection speed of the droplet is photographed and measured by the CCD camera arranged at the side of the eject port of the ink-jet nozzle using a flash light synchronized with the drive frequency of the piezo element of the ink-jet nozzle.

The droplet formed from the liquid material flow out from the eject port of the ink-jet nozzle is then, guided toward the opening of the drying part in the form of being blown at a constant speed and carried into the drying part from the opening. Since the direction of eject from the ink-jet nozzle can be controlled, the droplet can be accurately carried to the opening. The droplet carried into the drying part in this way is dried at a drying temperature of 300° C. and an air volume of 4 m$^3$/min and granulated.

The granulated particle(s) by drying in the drying part is collected in the granulated particle(s) collecting container 9 using the cyclone 8 installed at the exhaust port of hot air. Moreover, the micro powder which could not be collected by the cyclone 8 is collected using the micro powder collecting device (bag filter 10) and collected in the micro powder collecting container 11. As a result, most of the granulated particle(s) are collected in the granulated particle(s) collecting container 9, and almost no granulated particle(s) is collected in the micro powder collecting container 11.

Figure 2:
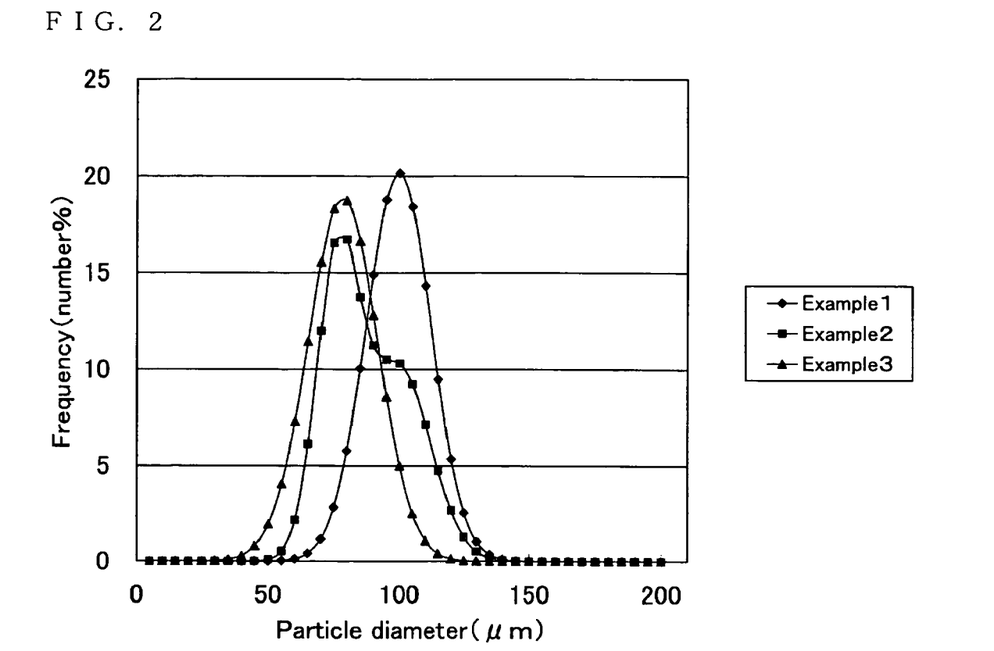
FIG. 2 is a diagram showing a particle size distribution of Example 1 and Example 2.

The ferrite precursor (granulated particle(s)) collected by the granulated particle(s) collecting container 9 in this Example 1 is photographed by SEM and the Feret diameter of 100 pieces of the ferrite precursor (granulated particle(s)) is measured. The average particle diameter (number average particle diameter) D and a standard deviation σ are calculated from the Feret diameter of a measured dry particle(s) and a CV value is calculated as the standard deviation σ/average particle diameter D. As a result, the average particle diameter of the ferrite precursor (granulated particle(s)) is D=99.7 μm, the standard deviation of the particle diameter is σ=12.5 μm, and the CV value is (σ/D)=0.13. The particle size distribution graph of the obtained ferrite precursor (granulated particle(s)) is shown in FIG. 2.

EXAMPLE 2

Granulating device: The granulating device of Example 2 is different from Example 1 in the point that a plurality of ink-jet nozzles with different nozzle diameters are provided at the eject part, and those other than the eject part are in the same construction as that of Example 1. Therefore, description for the liquid reserving part, the drying part and the collecting part will be omitted.

As the ink-jet nozzle part 4 of the eject part, those with the nozzle diameter of 60 μm and those with the nozzle diameter of 40 μm are provided in the same proportion. The method of the liquid material ejected from the ink-jet nozzle is the same as that in Example 1, but since the size of the formed droplet is controlled by the viscosity and the nozzle diameter of the liquid material and the drive frequency of the piezo element, a difference is caused by the difference in the nozzle diameter.

Granulating method using the granulating device: Next, the granulating method when the same Mn—Mg—Sr ferrite precursor (granulated particle(s)) as that in Example 1 is produced will be described. The liquid material with the same component as that of Example 1 and the viscosity of 100 mPa·s is prepared.

Then, a pressure vessel 1 is sealed after the liquid material and the stirring bar 2 for the magnetic stirrer 3 are put in. After that, to apply pressure to a pressure vessel 1 by sending compressed air into it. The liquid material with the stirring bar 2 enclosed is agitated by the stirring bar 2 rotated by the magnetic stirrer 3, and the mixed state where the solid component contained in the liquid material is dispersed in the liquid material is maintained.

Here, the diameter of each ink-jet nozzle is set to 60 μm and 40 μm in the same proportion according to the condition of the particle size distribution of a granulated particle(s) to be produced, the viscosity of the liquid material and the like. Also, a voltage of 5V and 70 kHz is set to be applied to the piezo element from the alternating current generating device 5 for driving ink-jet nozzle. Moreover, there needs to be a fine-tuning so that the drive frequency according to the eject state of the droplet measured by measuring means. The upper-limit drive frequency of the piezo element is set 720 kHz by calculating based on the nozzle diameter and the injection speed of the ink-jet nozzle.

The liquid material in the mixed state is supplied to the ink-jet nozzle of the eject part. The pressure to the liquid material to be supplied is controlled so that the liquid material supplied into the ink-jet nozzle of the eject part is ejected at a constant speed of 10 m/s. The injection speed of the droplet is measured by the CCD camera as with Example 1.

The droplet formed from the liquid material flowed out from the eject ports of the ink-jet nozzles with different nozzle diameters forms droplets with different sizes and then, it is guided toward the opening of the drying part in the form of being blown at a constant speed and carried into the drying part from the opening. The droplet carried into the drying part in this way is dried at a drying temperature of 300° C. and an air volume of 4 m$^3$/min and granulated.

The granulated particle(s) granulating in the drying part is collected in the granulated particle(s) collecting container 9 using the cyclone 8 installed at the exhaust port of hot air. Moreover, the micro powder which could not be collected by the cyclone 8 is collected using the micro powder collecting device (bag filter 10) and collected in the micro powder collecting container 11. As a result, most of the granulated particle(s) are collected in the granulated particle(s) collecting container 9, and almost no granulated particle(s) is collected in the micro powder collecting container 11.

The ferrite precursor (granulated particle(s)) collected by the granulated particle(s) collecting container 9 in this Example 2 is photographed by SEM and the Feret diameter of 100 pieces of the ferrite precursor (granulated particle(s)) is measured. The average particle diameter (number average particle diameter) D and a standard deviation σ are calculated from the Feret diameter of a measured dry particle(s) and a CV value is calculated as the standard deviation σ/average particle diameter D. The particle size distribution graph of the ferrite precursor (granulated particle(s)) collected by the granulated particle(s) collecting container 9 is shown in FIG. 2. As a result, the ferrite precursor (granulated particle(s)) with the particle size distribution with peaks at 100 μm and 76 μm is obtained, and the average particle diameter of the ferrite precursor (granulated particle(s)) is D=90.5 μm, the standard deviation of the particle diameter is σ=14.9 μm, and the CV value is (σ/D)=0.16. That is, the granulated powder showing a particle size distribution according to an arbitrarily set nozzle diameter can be produced and the granulated powder having a particle size distribution according to the design can be produced in a simplified process.

EXAMPLE 3

Example 3 is different from Example 1 in the point that solid amount in the liquid material. That is, an example to produce a Mn—Mg—Sr ferrite precursor with 100 μm of the average particle diameter of a granulated particle(s) as a granulated particle(s) same as Example 1 by using the granulating device same as Example 1. Therefore, description for the granulating device is omitted.

Granulating method using the granulating device: First, a liquid material is prepared. 25 liters of water is poured in a beads mill with the capacity of 40 liters and then, 3.11 kg of ferric oxide ($Fe_2O_3$), 1.78 kg of trimanganese tetroxide ($Mn_3O_4$), 0.114 kg of magnesium hydroxide ($Mg(OH)_2$), and 0.144 kg of strontium carbonate ($SrCO_3$) are inputted. As a binder component, 250 g of 10 wt % polyvinyl alcohol (PVA) solution is added. 275 g of 60 wt % of polycarboxylate polymer type surfactantsa solution as a dispersing agent, and 125 g of xanthan gum powder as a thickening agent are added. And then, crushing mixing is performed for 2 hours, and the prepared slurry is filtered by a mesh net made of stainless with 635 mesh to remove coarse particles and to prepare the liquid material. The solid amount of the liquid material is 16.7 wt %. And the viscosity of this liquid material is 100 mPa·s.

Next, a pressure vessel 1 is sealed after the liquid material and the stirring bar 2 for the magnetic stirrer 3 are put in. After that, to apply pressure to a pressure vessel 1 by sending compressed air into it. The liquid material with the stirring bar 2 enclosed is agitated by the stirring bar 2 rotated by the magnetic stirrer 3, and the mixed state where the solid component contained in the liquid material is dispersed in the liquid material is maintained.

The diameter of the ink-jet nozzle is set at 60 μm according to the conditions of the viscosity of the liquid material and the like. Also, an alternating voltage with a sinusoidal wave of the frequency of 70 KHz and amplitude of 5V is set to be applied to the piezo element from the alternating current generating device for driving ink-jet nozzle.

The liquid material in the mixed state is supplied to the ink-jet nozzle of the eject part connected to the liquid reserving part. The pressure to the liquid material to be supplied is controlled at the liquid reserving part so that the liquid material is flowed at a constant speed of 10 m/s. And the injection speed of the droplet is measured by the CCD camera same as Example 1.

The droplet formed from the liquid material flow out from the eject port of the ink-jet nozzle is then, guided toward the opening of the drying part in the form of being blown at a constant speed and carried into the drying part from the opening. The droplet carried into the drying part in this way is dried at a drying temperature of 300° C. and an air volume of 4 m³/min and granulated.

The granulated particle(s) by drying in the drying part is collected in the granulated particle(s) collecting container 9 using the cyclone 8 installed at the exhaust port of hot air. Moreover, the micro powder which could not be collected by the cyclone 8 is collected using the micro powder collecting device (bag filter 10) and collected in the micro powder collecting container 11. As a result, most of the granulated particle(s) are collected in the granulated particle(s) collecting container 9, and almost no granulated particle(s) is collected in the micro powder collecting container 11.

The ferrite precursor (granulated particle(s)) collected by the granulated particle(s) collecting container 9 in this Example 3 is photographed by SEM and the Feret diameter of 100 pieces of the ferrite precursor (granulated particle(s)) is measured same as Example 1 and Example 2. The particle size distribution graph of the ferrite precursor (granulated particle(s)) collected by the granulated particle(s) collecting container 9 is shown in FIG. 2. As a result, the ferrite precursor (granulated particle(s)) with the particle size distribution with peaks at 78 μm is obtained, and the average particle diameter of the ferrite precursor (granulated particle(s)) is D=78.3 μm, the standard deviation of the particle diameter is σ=13.3 μm, and the CV value is (σ/D)=0.17.

The result of the standard deviation of the particle diameter and the CV value in Example 3 are equal to Example 1 although the solid amount of the liquid material is lower than Example 1. Since adding xanthan gum powder as a thickening agent, it can be said that a thickening agent is effective in the case of producing the particle from the liquid material containing the smaller solid amount. Therefore, it can be produce the stable products by adding a thickening agent to the liquid material under 500 mPa·s of the viscosity.

As comparative examples, the same liquid material as that in Example 1 is prepared and granulated using a nozzle atomizer method (Comparative Example 1) and a disk atomizer method (Comparative Example 2) for comparison with Example 1.

COMPARATIVE EXAMPLE 1

In the Comparative Example 1, a drying device under the same environment as Example 1 at the drying temperature of 300° C. and the air volume of 4 m³/min is used and a nozzle atomizer is provided in this drying device, and a droplet is generated in the drying device. That is, the same liquid material as that of Example 1 supplied from outside the drying device is atomized using compressed air from a twin-fluid nozzle arranged inside the drying device so as to form a droplet, and the droplet is circulated in the drying device by an air flow to be altered and granulated. And the granulated particle(s) dried and granulated in the drying device is collected using a cyclone installed at an exhaust port of hot air and collected in a micro powder collecting container. Moreover, the micro powder which could not be collected by the cyclone is collected using a micro powder collecting device (bag filter) and collected in the micro powder collecting container. At this time, 15% of the total weight of the granulated particle(s) (the weight of the granulated particle(s) collected in the granulated particle(s) collecting container+the weight of the granulated particle(s) collected in the micro powder collecting container) is collected in the micro powder collecting container.

Figure 3:
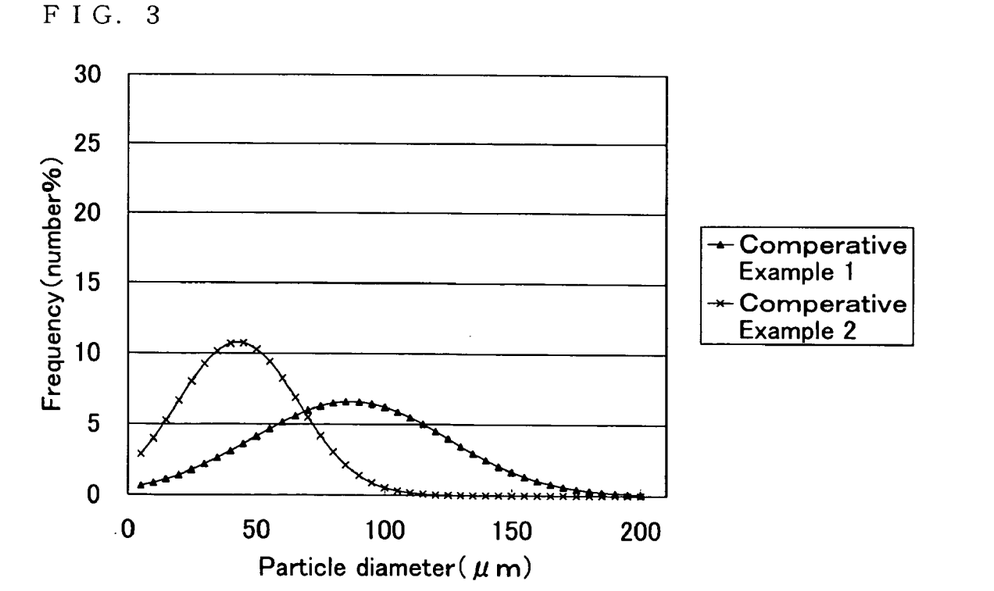
FIG. 3 is a diagram showing a particle size distribution of Comparative Example 1 and Comparative Example 2.

The measurement result of the ferrite precursor (granulated particle(s)) collected in the granulated particle(s) collecting container in Comparative Example 1 with the same method as that of Example shows that the average particle diameter is D=86.8 μm, the standard deviation of the particle diameter is σ=38.2 μm, and the CV value is (σ/D)=0.44. The particle size distribution graph of the granulated particle(s) obtained in Comparative Example 1 is shown in FIG. 3.

COMPARATIVE EXAMPLE 2

Using the same liquid material as that of Example 1, a disk atomizer arranged in the drying device kept in the environment at a drying temperature of 300° C. and an air volume of 4 m³/min is rotated, the liquid material supplied from the outside to the drying device is dropped onto a disk, a droplet is formed by dispersing it by a centrifugal force of the disk, the droplet is circulated in the drying device by an air flow to be altered and granulated, and the granulated particle(s) is collected by a collecting device. Then, the granulated particle(s) granulated by drying in the drying device is collected in a granulated particle(s) collecting container using a cyclone installed at an exhaust port of hot air. Moreover, a micro powder which could not be collected by the cyclone is collected using a micro powder collecting device (bag filter) and collected in the micro powder collecting container. At this time, 25% of the total weight of the granulated particle(s) (the weight of the granulated particle(s) collected in the granulated particle(s) collecting container+the weight of the granulated particle(s) collected in the micro powder collecting container) is collected in the micro powder collecting container.

The measurement result of the ferrite precursor (granulated particle(s)) collected in the granulated particle(s) collecting container in Comparative Example 2 with the same method as that of Example shows that the average particle diameter is D=42.9 μm, the standard deviation of the particle diameter is σ=23.4 μm, and the CV value is (σ/D)=0.54. The particle size distribution graph of the granulated particle(s) obtained in Comparative Example 2 is shown in FIG. 3.

COMPARATIVE EXAMPLE 3

The same liquid material, the liquid reserving part and the drying means as those of Example 1 are used, and the part using the continuous ink-jet method in Example 1 is replaced by a piezo-type ink-jet nozzle. That is, in Comparative Example 3, droplets are ejected from the ink-jet nozzle by driving the piezo element, and the liquid material is carried into the nozzle. The ink-jet nozzle with the nozzle diameter of 40 μm is arranged in 20 pieces vertically and 128 pieces laterally, an alternating voltage of a sinusoidal wave with the frequency of 8 KHz and amplitude of 80 V is applied to the piezo element so that a droplet is formed. The eject speed of the droplet is photographed by the CCD camera arranged at the side of the eject port of the ink-jet nozzle using a flash light synchronized with the driving frequency of the piezo element of the ink-jet nozzle and measured, and control is made to obtain 100 m/s. The granulated particle(s) is collected by the collecting device.

Upon execution under the above conditions, almost all the nozzles were plugged in several tens of seconds after start of granulation, and granulated particle(s) could not be obtained. As a result, since the liquid material is always collected in the ink reservoir once in the ink-jet nozzle in the piezo ink-jet device, there is a higher possibility that the solid component settles and plugs the nozzle if the flow of the liquid material is stopped even for a short time, and droplets can not be formed under the condition of the liquid material which can be otherwise used in the granulating method of the present invention.

COMPARISON BETWEEN EXAMPLE AND COMPARATIVE EXAMPLE

The average particle diameter D, the standard deviation σ and the CV value (σ/D) of the particles obtained in Example and Comparative Examples are shown in Table 1. Focusing on the standard deviation, the standard deviation of Example is smaller than Comparative Example 1 and Comparative Example 2. That is, it is understood that Example has a powder characteristic with the particle size distribution sharper than those of Comparative Examples. Moreover, the CV value of Example is smaller than those of Comparative Example 1 and Comparative Example 2. That is, Example produces a granulated particle(s) having an extremely sharp particle size distribution with little variation in the particle diameter as compared with Comparative Example 1 as well as Comparative Example 2.

[Table 1]

TABLE 1

| | Average particle diameter (D) | Standard deviation (σ) | CV value (σ/D) |
|---|---|---|---|
| Example 1 | 99.7 | 12.5 | 0.13 |
| Example 2 | 90.5 | 14.9 | 0.16 |
| Example 3 | 78.3 | 13.3 | 0.17 |
| Comparative Example 1 | 86.8 | 38.2 | 0.44 |
| Comparative Example 2 | 42.9 | 23.4 | 0.54 |
| Comparative Example 3 | — | — | — |

In Examples and Comparative Examples, production of the ferrite precursor (granulated particle(s)) is used as an example, but not limited to this, it is suitable for granulated particle(s) whose control of the particle diameter and particle size distribution is important such as various metal powders, oxides, edible powders, medicines, fertilizers, color materials, sensitized materials, fragrant materials, cosmetic materials and so on.

With the granulating method, granulated particle(s) and granulating device of the present invention, since granulation is made by controlling the size at the stage of a droplet formed from a liquid material for each ink-jet nozzle using the continuous ink-jet method and then, introducing it to the drying device for drying, the particle diameter can be controlled in a wide range and a granulated particle(s) having a sharp particle size distribution in a wide variety of compositions and a granulated particle(s) having a discretional particle size distribution can be produced with accuracy. By this, a production process can be reduced, and a granulating method with less production loss can be realized. Also, a granulated particle(s) made of more than one component can be granulated all at once and moreover, since granulation is made from a liquid material containing a solid component and a binder component, it can be reduced production costs of a many variety of types of granulated particle(s). Therefore, the granulating method, granulated particle(s) and granulating device which reduce production process and realize high yield can be used in various fields.

Particularly, when it is used for granulation of a ferrite carrier, by making the particle diameter uniform and sharper the particle size distribution, an image defects caused by the carrier can be reduced and high-quality images can be expected. That is, by reducing a content of fine particles smaller than a desired particle diameter, image defects such as carrier diffusion and white spots caused by it, white streaks caused by a scratch on a photoreceptor drum can be reduced. Moreover, need classification more than once to obtain a desired particle size distribution with a granulated powder produced by the conventional granulating method, but by using the granulating method of the present invention, the desired particle size distribution can be intentionally controlled at granulation, which can omit a classification process and exerts an effect in production costs.

In general, if an added amount of a binder is increased at granulation and appropriate baking or sintering is carried out according to each application, the contact reaction interface area of a granulated particle(s) can be increased after baking or sintering by a hole from which the binder component is drawn as a gas such as $CO_2$, $H_2O$ and the like. Therefore, when producing a granulated particle(s) using the granulating method of the present invention and in the post process, by appropriately setting the conditions such as granulating conditions including performance of the binder component and an added amount as well as conditions of baking or sintering and the like, the contact reaction interface area can be increased even though the particle diameter is large, and activity at chemical reactions such as oxidation-reduction can be improved. By this, problems in handling performance such as a hanging phenomenon and aggregation by a micro powder can be solved and production of a granulated particle(s) with a good response is made possible at the same time. Thus, it is effective in granulation of a material powder used in a dielectric material and a battery material or a granulated particle(s) requiring high water solubility. Moreover, since a granulated particle(s) made of discretional plural particle diameters can be produced, a filling amount can be increased by setting a particle size distribution to fill a gap between particles. In this way, by improving the handling performance and realizing increases of a specific surface and a filling amount at the same time, creation of a dielectric material and battery material with higher performance than before can be expected.

What is claimed is:

1. A granulating method for forming a particle from a liquid material by using a continuous ink-jet method comprising the steps of:
   a) supplying a liquid material containing a solid component and a binder component into one or more ink-jet nozzles of a continuous ink-jet nozzle;
   b) applying fluctuating pressure to eject the supplied liquid material as a continuous liquid flow from the ink-jet nozzles;
   c) separating said continuous liquid flow ejected from the ink-jet nozzles to form a droplet;
   d) carrying the droplet into a drying means for drying the droplet; and
   e) obtaining a granulated particle(s) by drying the carried droplet.

2. The granulating method according to claim 1, which is characterized in that controlling a condition of the liquid flow from the ink-jet nozzle in order to keep a desired droplet diameter while monitoring the formed droplet.

3. The granulating method according to claim 1, which is characterized in that when two or more ink-jet nozzles are used, to set an average diameter of droplet formed from each of the ink-jet nozzles.

4. A granulating method for forming a particle from a liquid material by using a continuous ink-jet method comprising:
   supplying a liquid material containing a solid component and a binder component into one or more ink-jet nozzles of a continuous ink-jet nozzle;
   forming a droplet by ejecting the supplied liquid material from the ink-jet nozzles;
   carrying the droplet into drying means for drying the droplet; and
   obtaining a granulated particle(s) by drying the carried droplet, which is
characterized in that when two or more ink-jet nozzles are used, to form the droplet so as to change the component of the droplet formed from each ink-jet nozzle.

5. The granulating method according to claim 1, which is characterized in that the solid component of the liquid material contains one or more components selected from inorganic or organic substances.

6. The granulating method according to claim 1, which is characterized in that the liquid material is used after removing coarse particles by a filter of 500 mesh or more.

7. The granulating method according to claim 1, which is characterized in that the liquid material is used with the viscosity of 500 mPa·s or less.

8. The granulating method according to claim 1, which is characterized in that to add a thickening agent to the liquid material.

9. The granulating method according to claim 1, which is characterized in that the diameter of the ink-jet nozzle is selectively-used in a range of 20 μm to 120 μm according to the particle diameter of a granulated particle(s).

10. The granulating method according to claim 1, which is characterized in that eject of the liquid material from the ink-jet nozzle is carried out such that the liquid material is continuously supplied into the ink-jet nozzle and ejected at a constant speed by a supply liquid material pressure, and applying the fluctuation pressure to a liquid material flow passing through the ink-jet nozzle.

11. The granulating method according to claim 1, which is characterized in that using the piezo element and applying pressure to the liquid material flow is made fluctuate based on controlling an applied voltage to the piezo element.

* * * * *